(12) United States Patent
Schnacker

(10) Patent No.: US 9,113,621 B1
(45) Date of Patent: Aug. 25, 2015

(54) FISH BITE DETECTOR

(71) Applicant: Kelly Schnacker, Kearney, NE (US)

(72) Inventor: Kelly Schnacker, Kearney, NE (US)

( * ) Notice: Subject to any disclaimer, the term of this patent is extended or adjusted under 35 U.S.C. 154(b) by 197 days.

(21) Appl. No.: 14/063,471

(22) Filed: Oct. 25, 2013

(51) Int. Cl.
*A01K 79/02* (2006.01)
*A01K 97/12* (2006.01)

(52) U.S. Cl.
CPC ....................... *A01K 97/12* (2013.01)

(58) Field of Classification Search
USPC ............................................. 43/17.1
See application file for complete search history.

(56) References Cited

U.S. PATENT DOCUMENTS

| | | | |
|---|---|---|---|
| 3,453,767 A | 7/1969 | Lake et al. | |
| 4,702,031 A * | 10/1987 | Sousa | 43/17 |
| 4,939,864 A * | 7/1990 | Bowles | 43/17 |
| 5,216,831 A * | 6/1993 | Halterman, Jr. | 43/44.91 |
| 5,515,639 A * | 5/1996 | Phipps | 43/17 |
| 5,669,175 A * | 9/1997 | Phipps | 43/17 |
| 5,881,488 A | 3/1999 | Canepa | |
| 5,884,429 A * | 3/1999 | Cube | 43/17 |
| 6,101,757 A * | 8/2000 | Draghici | 43/17 |
| 6,708,441 B2 | 3/2004 | Dirito | |
| 7,624,531 B2 * | 12/2009 | Kirby | 43/17 |
| 8,336,248 B2 | 12/2012 | Miskatovic | |
| 2007/0068062 A1 * | 3/2007 | Zeglen | 43/17 |
| 2011/0095894 A1 | 4/2011 | Gibson et al. | |
| 2011/0203156 A1 * | 8/2011 | Christiansen | 43/17 |
| 2012/0222345 A1 * | 9/2012 | Sanchez | 43/17 |

FOREIGN PATENT DOCUMENTS

WO    WO 2008147332 A1 * 12/2008

* cited by examiner

*Primary Examiner* — Christopher P Ellis
(74) *Attorney, Agent, or Firm* — Williams Intellectual Property; Benjamin F. Williams

(57) ABSTRACT

A fish bite detector attachable to a fishing line proximal a reel of an extant fishing rod, said fish bite detector including a weight member having an elongate first portion disposed thereatop, said elongate first portion having a radial maximum at a midpoint and narrowing towards an elongate second portion, said elongate second portion substantially narrower than the elongate first portion and attachable to an extant fishing line by insertion of said fishing line into an aperture disposed proximal a proximal end of the elongate second portion, whereby acceleration of the fishing line is visually signaled to a fisherman by displacement of the fish bite detector when disposed weighing on the line.

3 Claims, 2 Drawing Sheets

FISH BITE DETECTOR

BACKGROUND OF THE INVENTION

Various types of fish bite detectors are known in the prior art. Most involve some sort of electronic sensing means to signal a fish has taken the line. Such electronic equipment requires batteries, or other power sources, and is sensitive to the elements. What is needed is a fish bite detector mechanically operable to visually signal a fish has taken a fishing line, without the need of electronic components, said fish bite detector attachable to a fishing line proximal a reel of an extant fishing rod, the fish bite detector including a weight member having an elongate first portion disposed thereatop, said elongate first portion having a radial maximum at a midpoint and narrowing towards an elongate second portion, said elongate second portion substantially narrower than the elongate first portion and attachable to an extant fishing line by insertion of said fishing line into an aperture disposed proximal a proximal end of the elongate second portion, whereby acceleration of the fishing line is visually signaled to a fisherman by displacement of the fish bite detector when disposed weighing on the line.

FIELD OF THE INVENTION

The present invention relates to a fish bite detector, and more particularly, to a fish bite detector that is attachable to a fishing line proximal a reel of an extant fishing rod, said fish bite detector including a weight member having an elongate first portion disposed thereatop, said elongate first portion having a radial maximum at a midpoint and narrowing towards an elongate second portion, said elongate second portion substantially narrower than the elongate first portion and attachable to an extant fishing line by insertion of said fishing line into an aperture disposed proximal a proximal end of the elongate second portion, whereby acceleration of the fishing line is visually signaled to a fisherman by displacement of the fish bite detector when disposed weighing on the line.

SUMMARY OF THE INVENTION

The general purpose of the fish bite detector, described subsequently in greater detail, is to provide a fish bite detector which has many novel features that result in a fish bite detector which is not anticipated, rendered obvious, suggested, or even implied by prior art, either alone or in combination thereof.

The present device has been devised to enable visual signaling of a fish taking an extant fishing line without the need of electronic devices as seen in the art today. The present device hooks to an extant fishing line proximal the reel of an extant fishing rod and thereat weighs upon the line. Acceleration of the line, such as when a fish takes the line, is visibly cued to a fisherman by displacement of the present fish bite detector.

The present fish bite detector, therefore, includes a weight member. An elongate first portion is disposed perpendicularly atop the weight member. The elongate first portion is generally cylindrical, but widens toward a midpoint and thence narrows towards an elongate second portion disposed atop the elongate first portion.

The elongate second portion is substantially narrower than the elongate first portion and narrows towards a proximal end disposed atop the elongate second portion. An aperture is disposed in the elongate second portion proximal the proximal end. The aperture includes a vertical portion, disposed along a vertical axis of the elongate second portion, and a sloped entry cut disposed in the elongate second portion to connect with the vertical portion of the aperture.

Extant fishing line may therefore be input into the vertical portion of the aperture by insertion through the sloped entry cut. The vertical portion extends above the sloped entry cut, and the weight member, applying weight to the line, maintains the line within the vertical portion of the aperture. The present fish bite detector thus depends from the fishing line. The fishing line is enabled travel through the vertical portion of the aperture. The fish bite detector is also expediently removable from the line, when desired, such as previous to casting or reeling in a catch.

The present fish bite detector is preferably disposed proximal the reel of an extant fishing rod. Thus, when the line is accelerated, the fish bite detector is displaced as the line is tensioned. The vertical displacement of the fish bite detector, therefore, visually signals to a fisherman that the line has been taken whereby appropriate action is engendered.

Thus has been broadly outlined the more important features of the present fish bite detector so that the detailed description thereof that follows may be better understood and in order that the present contribution to the art may be better appreciated.

Objects of the present fish bite detector, along with various novel features that characterize the invention are particularly pointed out in the claims forming a part of this disclosure. For better understanding of the fish bite detector, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
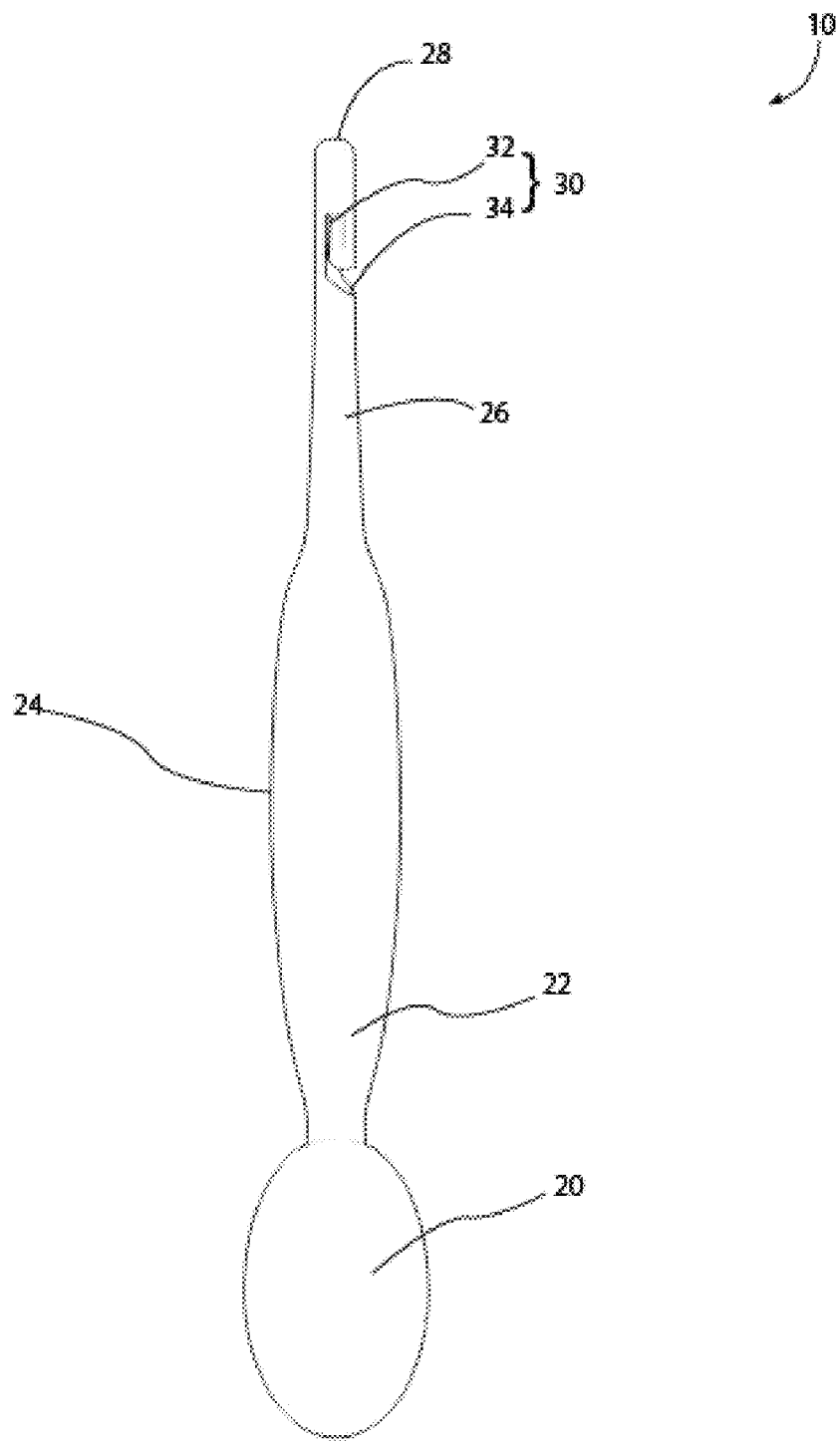
FIG. 1 is a side view
Figure 2:
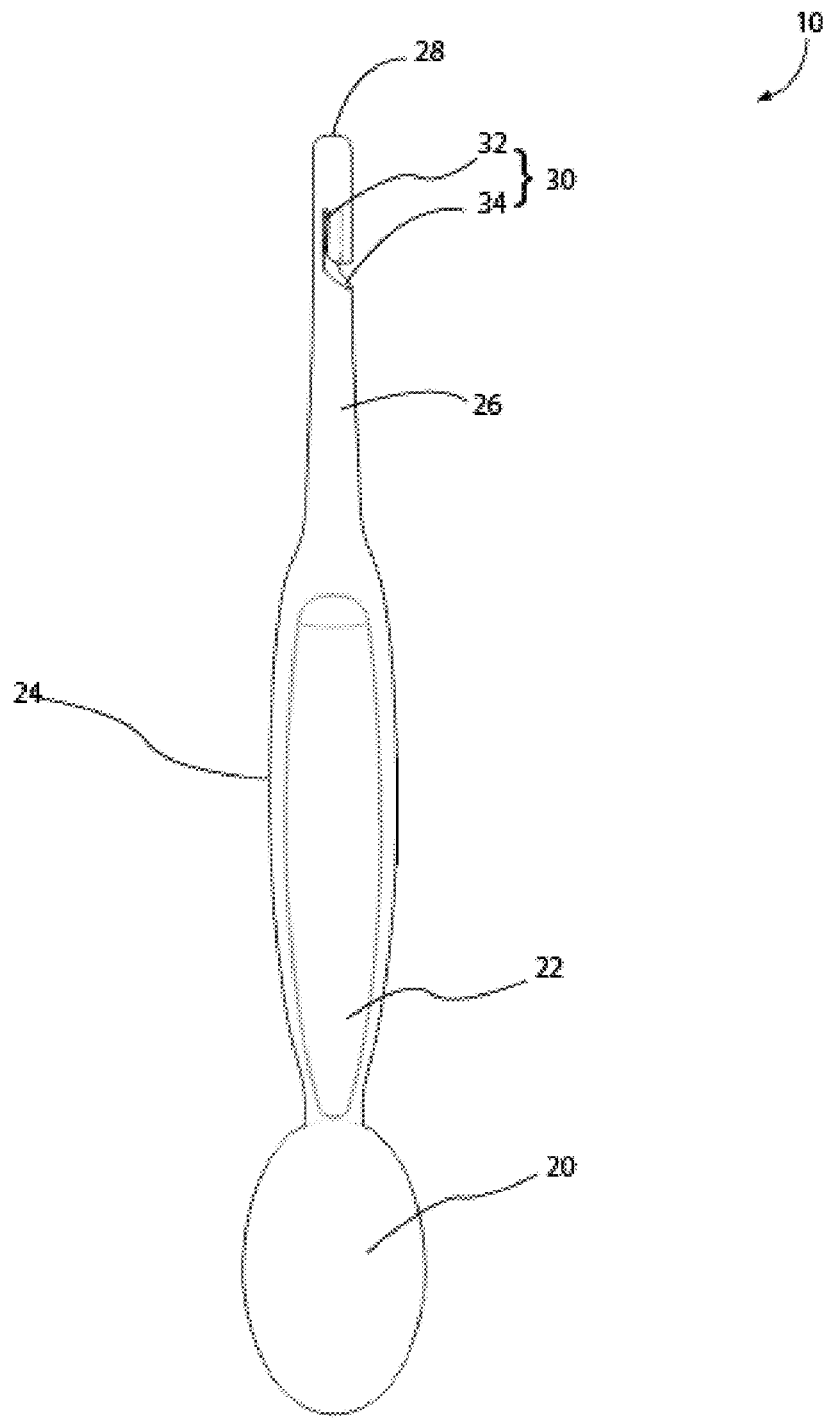
FIG. 2 is a longitudinal section view.

With reference now to the drawings, and in particular FIGS. 1 through 2 thereof, example of the instant fish bite detector employing the principles and concepts of the present fish bite detector and generally designated by the reference number 10 will be described.

Referring to FIGS. 1 through 2 a preferred embodiment of the present fish bite detector 10 is illustrated.

The present fish bit detector 10 enables a mechanical means of detecting a fish biting an extant line of a fishing rod without the need of electronic components or an audible alarm. Rather, the present fish bite detector 10 hooks to an extant fishing line proximal the reel of the fishing rod and signals a bite to a fisherman by movement thereat when tension is applied to the line.

The present fish bite detector 10, therefore, includes a weight member 20 disposed to apply weight to a fishing line to which the present fish bite detector 10 is applied. An elongate first portion 22 is disposed atop the weight member 20 and extends perpendicularly therefrom. The elongate first portion 22 is generally cylindrical, but includes a widening radius to a maximum radius disposed at a midpoint 24 located proximally centrally along the length of the elongate first portion 22. The radius thence narrows towards an elongate second portion 26 disposed atop the elongate first portion 22.

The elongate second portion 26 is disposed atop the elongate first portion 22 and extends along a common central axis of the elongate first portion 22. The elongate second portion 26 is substantially narrower than the elongate first portion 22, and narrows along its length toward a proximal end 28 disposed atop the elongate second portion 26.

An aperture 30 is disposed in the elongate second portion 26 proximal the proximal end 28. The aperture 30 includes a vertical portion 32, disposed along a vertical axis of the second elongate portion 26, and a sloped entry cut 34 disposed in the second elongate portion 26. Extant fishing line is thereby positional within the aperture 30 by sliding the extant fishing line into the vertical portion 32 of the aperture 30 through the sloped entry cut 34. Once the line is positioned within the aperture 30, the weight member 20 maintains the fish bite detector 10 upon the line with the line engaged within the vertical portion 32 of the aperture 30. To remove the fish bite detector 10 from the line, a user lifts the fish bite detector 10 such that the line is removable through the sloped entry cut 34.

When strung to an extant fishing line proximal the reel of an extant fishing rod, the present fish bit detector 10 weighs on the line. When tension is applied to the line, such as when a fish bites the line, the fish bite detector 10 is moved as the line tensions. Rising of the fish bite detector 10, or other visible displacement of the fish bite detector 10, therefore, upon the line signals to a user that a fish has taken the line and appropriate action may thence be taken to reel the fish in.

Thus, the elongate second portion 26 hooks to a fishing line by insertion of said fishing line into the vertical portion 32 of the aperture 30, said line positional through the sloped entry cut 34, whereby the fish bite detector 10 is disposed depending from the fishing line proximal a reel of an extant fishing rod, said fish bite detector 10 thereat moveable in response to tension placed upon the line when, for example, a fish bites the line.

What is claimed is:

1. A fish bite detector comprising:
    a weight member;
    an elongate first portion disposed atop the weight member;
    an elongate second portion disposed atop the elongate first portion, said elongate second portion narrower than the elongate first portion;
    a proximal end disposed atop the second elongate portion;
    an aperture disposed in the elongate second portion proximal the proximal end, said aperture including a vertical portion disposed along a vertical axis of the second elongate portion and a sloped entry cut disposed in the second elongate portion; and
    wherein the elongate second portion hooks to a fishing line by insertion of said fishing line into the vertical portion of the aperture through the sloped entry cut, whereby the fish bite detector is disposed depending from the fishing line proximal a reel of an extant fishing rod, said fish bite detector thereat moveable in response to tension placed upon the line to visually signal a fish upon the line.

2. The fish bite detector of claim 1 wherein the elongate first portion includes a radial maximum disposed at a midpoint thereof.

3. A fish bite detector comprising:
    a weight member;
    an elongate first portion disposed atop the weight member;
    a midpoint disposed upon the elongate first portion, said elongate first portion widest at the midpoint and narrowing therefrom;
    an elongate second portion disposed atop the elongate first portion, said elongate second portion substantially narrower than the elongate first portion;
    a proximal end disposed atop the second elongate portion;
    an aperture disposed in the elongate second portion proximal the proximal end, said aperture including a vertical portion disposed along a vertical axis of the second elongate portion and a sloped entry cut disposed in the second elongate portion; and
    wherein the elongate second portion hooks to a fishing line by insertion of said fishing line into the vertical portion of the aperture through the sloped entry cut, whereby the fish bite detector is disposed depending from the fishing line proximal a reel of an extant fishing rod, said fish bite detector thereat moveable in response to tension placed upon the line to visually signal a fish upon the line.

\* \* \* \* \*